United States Patent [19]

Hieda

[11] 4,249,116

[45] Feb. 3, 1981

[54] CONTROLLER FOR COMPUTER CONTROL OF BRUSHLESS DC MOTORS

[76] Inventor: Robert A. Frosch, Administrator of the National Aeronautics and Space Administration, with respect to an invention of Lester S. Hieda, Maui, Hi.

[21] Appl. No.: 23,484

[22] Filed: Mar. 23, 1979

[51] Int. Cl.³ .............................................. H02P 6/02
[52] U.S. Cl. .................................... 318/254; 318/138; 318/439
[58] Field of Search ................... 318/138, 254, 254 A, 318/439

[56] References Cited

U.S. PATENT DOCUMENTS

| | | | |
|---|---|---|---|
| 3,483,458 | 12/1969 | Kirk | 318/138 |
| 3,531,702 | 9/1970 | Hill | 318/138 |
| 3,696,277 | 10/1972 | Liska et al. | 318/138 |
| 3,716,769 | 2/1973 | Brunner | 318/254 |
| 3,757,185 | 9/1973 | Brunner et al. | 318/254 |
| 3,806,783 | 4/1974 | Lodochnikov | 318/138 |
| 3,840,790 | 10/1974 | Stich et al. | 318/254 |
| 3,866,099 | 2/1975 | Bourbeau | 318/254 |
| 4,047,081 | 9/1977 | Liska | 318/138 |

Primary Examiner—Gene Z. Rubinson
Assistant Examiner—John W. Redman
Attorney, Agent, or Firm—Monte F. Mott; John R. Manning; Paul F. McCaul

[57] ABSTRACT

An improved motor speed and torque controller for brushless DC motors which provides an unusually smooth torque control arrangement. The controller provides a means for controlling a current waveform in each winding of a brushless DC motor by synchronization of an excitation pulse train from a programmable oscillator. Sensing of torque for synchronization is provided by a light beam chopper mounted on the motor rotor shaft. Speed and duty cycle are independently controlled by controlling the frequency and pulse width output of the programmable oscillator. A means is also provided so that current transitions from one motor winding to another is effected without abrupt changes in output torque.

6 Claims, 9 Drawing Figures

CONTROLLER FOR COMPUTER CONTROL OF BRUSHLESS DC MOTORS

ORIGIN OF THE INVENTION

The invention described herein was made in the performance of work under a NASA contract and subject to the provisions of Section 305 of the National Aeronautics and Space Act of 1958, Public Law 85-568 (72 Stat. 435; 42 USC 2457).

FIELD OF THE INVENTION

This invention relates to electrical motor excitation and control systems and, more particularly, to improvements therein.

BACKGROUND OF THE INVENTION

A problem encountered with conventional DC brushless motor control systems is to provide electrical excitation signals which simulate the combination of an automobile engine and transmission. Conventional control systems frequently control motor speed as a function of the frequency of an oscillator which applies excitation to the motor windings, but have difficulty in duplicating the variable torque as required which simulates power transferred by an automatic transmission. In particular, difficulty has frequently been experienced in conventional control systems in obtaining smooth torque and speed variations from control signals applied to the winding excitation oscillator. Also, a phenomema called notching is frequently experienced during slow rotation of motors utilizing conventional motor control systems. Notching occurs as a result of the transfer of excitation from one winding of the motor to an adjacent winding. The present invention solves the above problems by providing a control system having unusually smooth torque and frequency control.

OBJECTS AND SUMMARY OF THE INVENTION

An object of this invention is to provide a novel speed and torque controlling system for a brushless DC motor.

Yet another object of this invention is to provide a system for smoothly controlling the torque of a brushless DC motor.

A further object of this invention is to provide a system with a minimum number of devices to conserve power.

The foregoing and other objects of the invention are achieved in a system wherein a sensor on the motor rotor shaft provides feedback signals proportional to motor shaft rotation to a decoder circuit. The decoder circuit utilizes some of the feedback signals to derive a synchronization signal which is supplied to an oscillator for the purpose of controlling a phase lead or lag in the oscillator output. The oscillator output is supplied to the decoder circuit which combines it with outputs derived from the sensor, the resulting signals being used to precisely gate power transistors which furnish power to the motor windings for smooth operation of the motor. The oscillator is programmable, that is, its frequency and duty cycle are controlled by suitable signals from other sources, one of which could be a computer.

The novel features of the invention are set forth with particularity in the appended claims. The invention will be best understood from the following description when read in conjunction with the accompanying drawings.

DETAILED DESCRIPTION

As required, a detailed illustrative embodiment of the invention is disclosed herein. This embodiment exemplifies the invention and is currently considered to be the best embodiment for such purposes. However, it is to be recognized that other means for controlling the frequency and the duty cycle of the programmable oscillator could be utilized and other types of sensors could be used for determining shaft rotation. Accordingly, the specific embodiment disclosed is representative in providing a basis for the claims which define the scope of the present invention.

Figure 1:
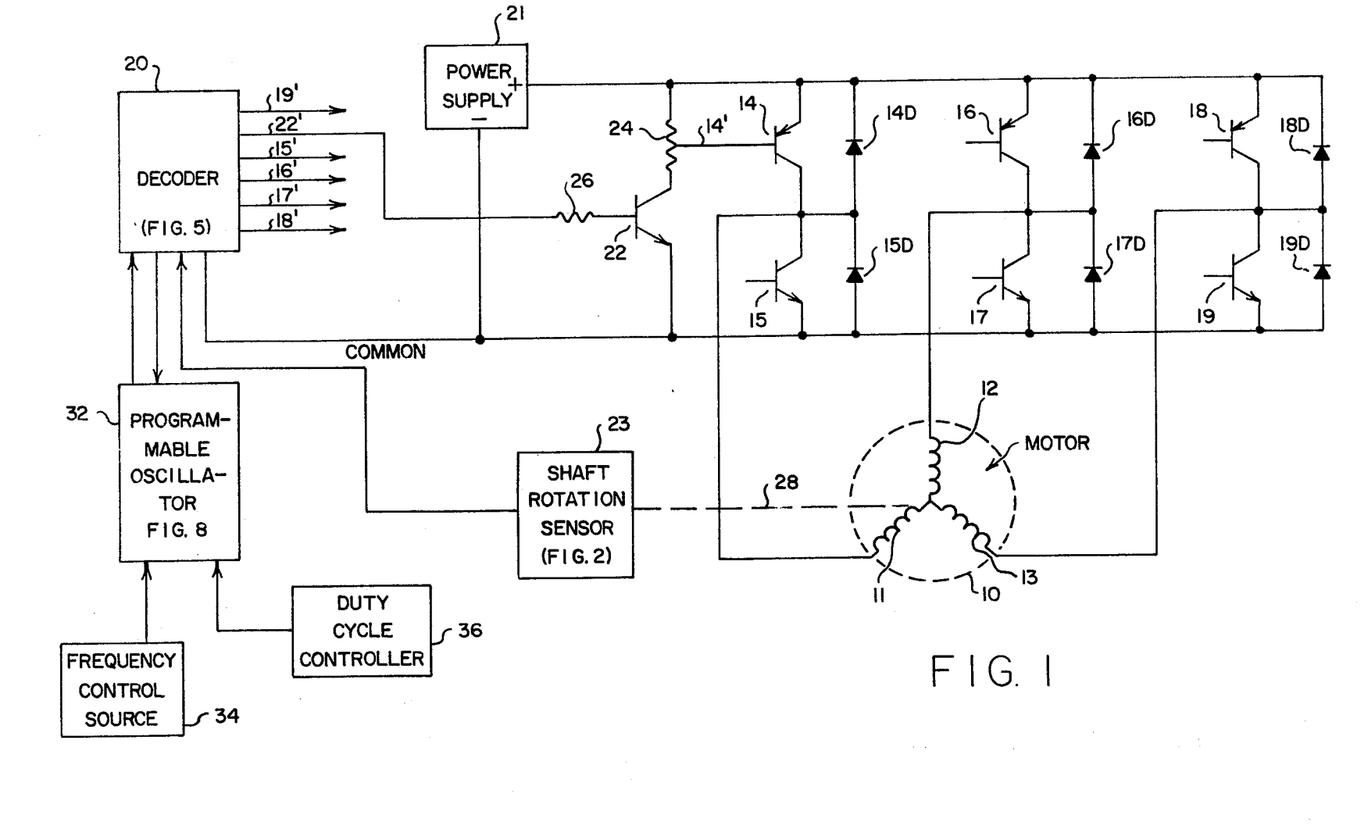
FIG. 1 is a block-schematic diagram of an embodiment according to the present invention.

Referring to FIG. 1, a standard 3 phase AC power motor 10 having its armature modified for operation in a brushless DC mode is utilized. The motor 10 has first, second, and third armature windings 11, 12, and 13, respectively. The first armature winding 11 is supplied power by a first complementary transistor pair 14 and 15, the second armature winding 12 by a second transistor pair 16 and 17, and the third armature winding 13 by a third transistor pair 18 and 19. Enabling pulses to these transistors, which will be explained in detail below, are provided by outputs from a decoder 20. Thus decoder output signals 22', 15', 16', 17', 18', and 19' are provided to transistors 14, 15, 16, 17, 18, and 19, respectively. Transistors 14 and 15 are serially connected across a power supply 21. That is, the emitter of transmitter 14 is connected to a positive terminal of the power supply 21, the collector of transistor 14 is connected to the collector of transistor 15, and the emitter of transmitter 15 is connected to a common or ground terminal of the power supply 21. The junction of the collectors of transistors 14 and 15 are connected to the first winding 11 of the motor 10. This junction is also connected to the junction of two diodes, 14D and 15D, which are serially connected across the power supply 21. These diodes effectively perform a dual function, the first being to protect the transistors 14 and 15 across which they are connected and the second being to return current back into the power supply 21 in an action similar to that of a generator. For example, if the power supply 21 were a rechargable battery, then the action of the two diodes 14D and 15D would allow the batteries to be charged during motor coasting.

Transistor 16 and 17 are also serially connected across the power supply 21 in the same manner as previously described for transistors 14 and 15. The junction of the collectors of transistor 16 and 17 is connected to a junction between two serially connected diodes 16D and 17D, also serially connected across the power supply 21. The junction is also connected to the second winding 12 of the motor 10.

Transistors 18 and 19 are also serially connected across the power supply 21 in the same manner as described for transistors 14 and 15. Again, the junction of the collectors of these transistors is connected to the third motor winding 13, and also to the junction of two serially connected dioes 18D and 19D, which are also connected across the power supply 21.

An input transistor 22 has its collector terminal connected to a load resistor 24 which in turn is connected to the positive terminal of the power supply 21. The input transistor 22 emitter terminal is connected to the common or ground terminal of the power supply 21. The base of the input transistor 22 is connected to the decoder 20 through an input resistor 26. The base of the transistor 14 is connected to the load resistor 24.

Figure 2:
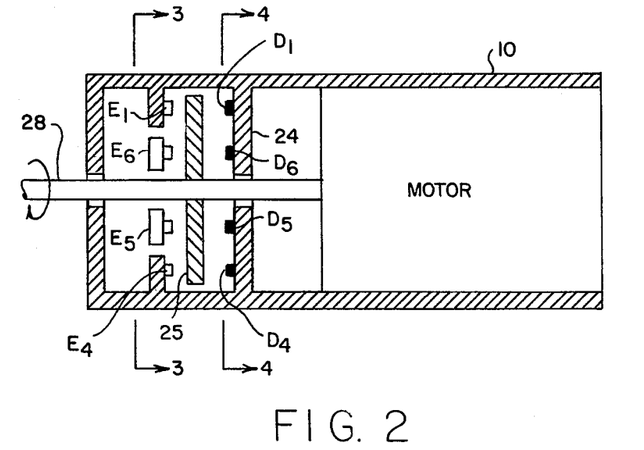
FIG. 2 is an elevational view of the motor and sensor.
Figure 3:
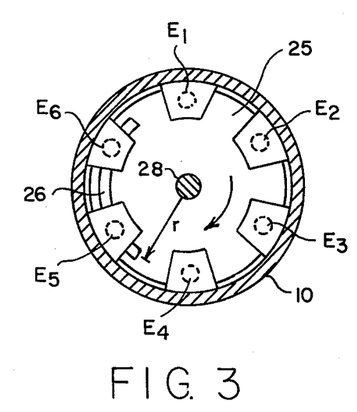
FIG. 3 is taken along line 3—3 of FIG. 2.
Figure 4:
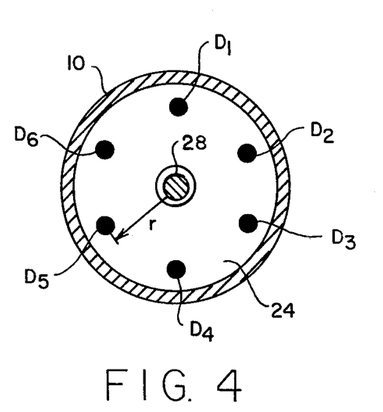
FIG. 4 is taken along line 4-4 of FIG. 2.

In this particular embodiment, synchronization signals for the decoder 20 are derived from a shaft rotation sensor 23. Referring to FIGS. 2, 3 and 4, the shaft rotation sensor 23 includes six photodiodes D1 through D6, a photodiode mounting plate 24, a rotating chopper wheel 25, and six light emitting diodes E1 through E6. The mounting plate 24 is fixedly attached to the motor 10 case and the chopper wheel 25 is attached to a motor shaft 28. The rotating chopper wheel 25 forms an arcuate slot 26 having a radial distance r with respect to the center of the motor shaft 28. The slot 26 subtends an angle of 123 degrees with respect to the center of the shaft 28. The six photodiodes D1-D6 are spaced 60 degrees apart from each other on the mounting plate 24, and are located along a circle having a radius r with respect to the motor shaft 28. The six light emitting diodes E1-E6 are mounted opposite their respective photodiodes D1-D6, the rotating chopper wheel 25 being positioned between the photodiodes and the light emitting diodes. In operation, as the chopper wheel 25 rotates, each photodiode D is irradiated by its associated light emitting diode E during a time period in which the slot 26 is positioned therebetween. Thus each photodiode provides an output signal during the time period required for the motor shaft 28 to rotate 123 degrees, and the output of each photodiode is displaced 60 degrees with respect to its two adjacent photodiodes.

Referring again to FIG. 1, the photodiode output signals from the shaft rotation sensor 23 are provided to the decoder 20 along with square wave pulses from a programmable oscillator 32. The frequency of the programmable oscillator 32 pulses can be determined by the frequency of signals supplied from a frequency control source 34. The duty cycle or pulse width of the pulses from the programmable oscillator 32 are determined by a DC voltage signal received from a duty cycle controller 36 as will be explained below.

Signals from the shaft rotation sensor 23 are used by the decoder 20 to develop synchronization signals for the power transistors 15 through 19 and 22. An output from the decoder 20, also in response to signals from the shaft rotation sensor 23, is supplied to the programmable oscillator 32 to preset the phase of the programmable oscillator 32 output, thereby assuring that the proper power transistor is in the ON state at the appropriate time to provide current to the motor 10 and to avoid roughness or possible deadspots as the motor windings are pulsed.

Figure 5:
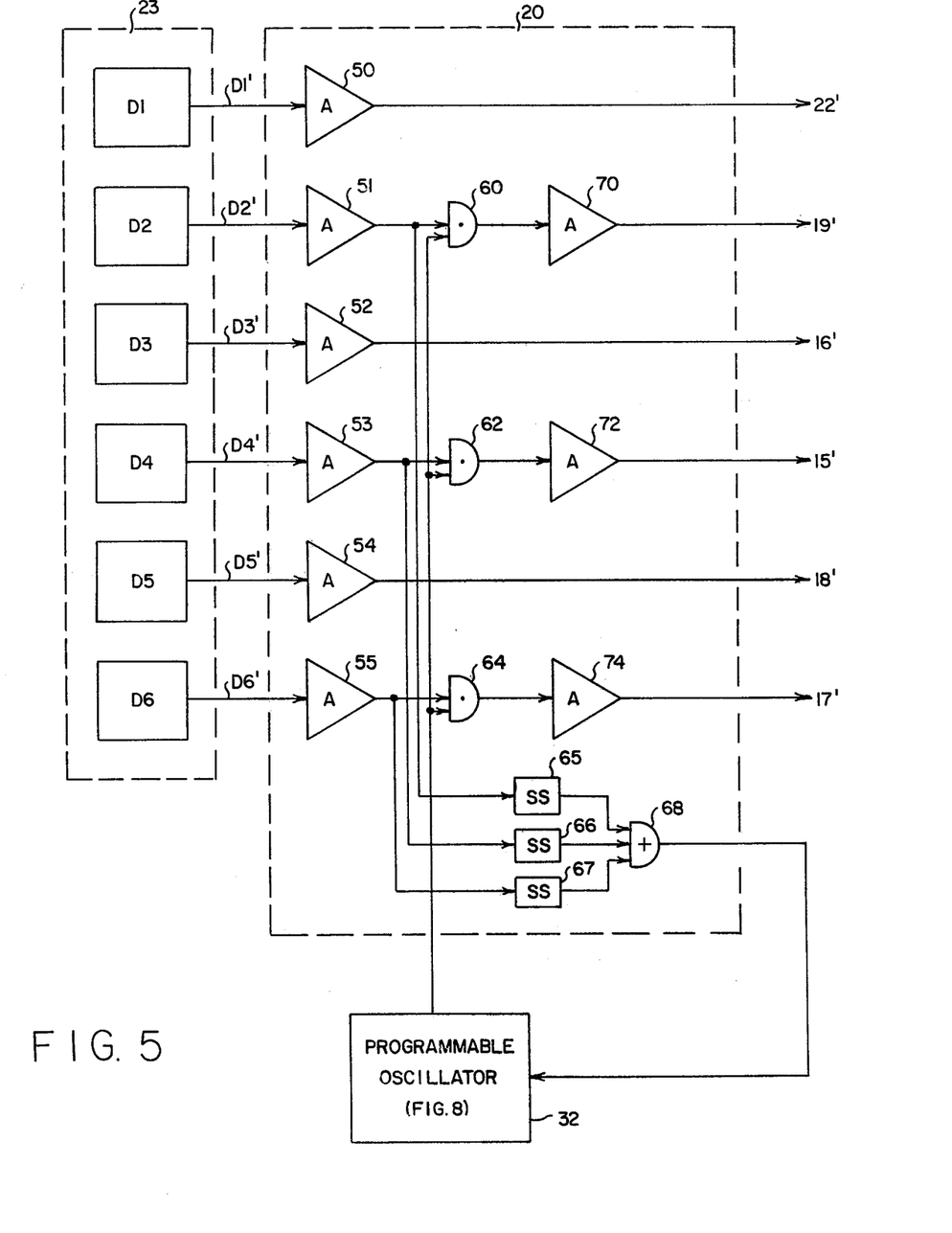
FIG. 5 is a schematic diagram of the decoder.

FIG. 5 is a schematic diagram of the decoder 20. The six photodiodes D1-D6 provide output signals D1' through D6' from the shaft rotation sensor as previously explained. Thus by reference to FIG. 6 it can be seen that each photodiode provides an output signal which occurs during 123 degrees of the motor shaft 28 rotation, each photodiode output overlapping the two adjacent photodiode outputs by approximately 60 degrees. Referring now to FIG. 5, the photodiode output signals D1'-D6' are amplified by photodiode amplifiers 50-55, respectively. The outputs of three photodiode amplifiers 51, 53 and 55 which are referred to as first gating signals are provided to one input of corresponding AND gates 60, 62, and 64. The outputs of the three photodiode amplifiers 51, 53 and 55 are also provided to single-shot multivibrators 65, 66 and 67 respectively. The multivibrators 65, 66, and 67 are chosen so that they provide a single output pulse for each input pulse regardless of its duration. Thus multivibrator 65, for example, provides a single output pulse for each 360 degrees of motor shaft 28 rotation, that pulse occurring at the time photodiode D2 initially provides an output signal. Outputs from the three single shot multivibrators 65, 66, and 67 are provided as inputs to an OR gate 68, the output of which is connected to the programmable oscillator 32. Thus, a pulse appears at the output of the OR gate 68 each time that one of the photodiodes D initially senses its corresponding light emitting diode E. These pulses are designated as correlation signals. Outputs from the other three photodiode amplifiers 50, 52 and 54 which are referred to as second gating signals are provided directly to the bases of transistors 22, 16 and 18 respectively.

An output from the programmable oscillator 32 is provided as a second input to AND gates 60, 62 and 64, the outputs of which are applied to amplifiers 70, 72, and 74. An output 19' of amplifier 70 is applied to the base of transistor 19, an output 15' of amplifier 72 is applied to the base of transistor 15. An output of 17' of amplifier 74 is applied to the base of transistor 17'. The outputs 19', 15' and 17' are referred to as third gating signals.

Figure 7:
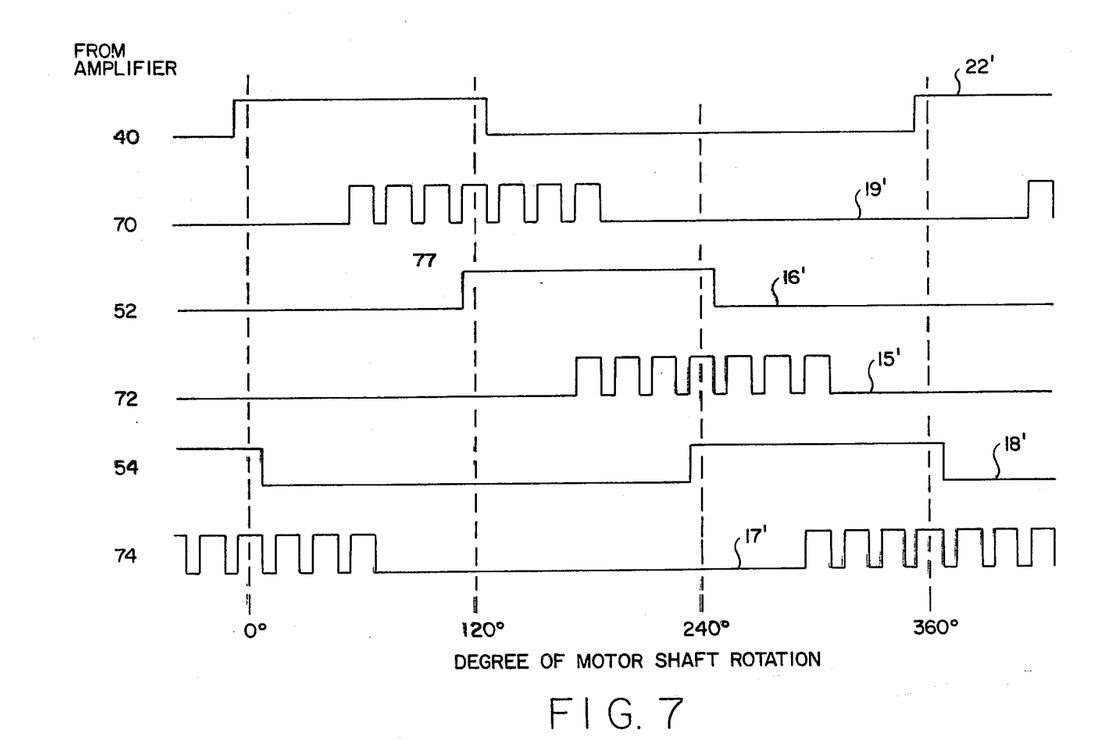
FIG. 7 is a waveform drawing illustrating the waveform outputs applied by the decoder to the power transistors.

The waveforms applied to the bases of the transistors 15-19 and 22 shown in FIG. 1 are shown in FIG. 7. Reference numerals having primes designate the waveforms which are supplied to the transistors having corresponding numerals without primes. Thus, transistor 14 is switched on when transistor 22 is switched on in response to signal 22' from the decoder 20. Transistor 19, following the switching on of transistor 14 (and transistor 22) has a sequence of pulses (to be explained below) from the programmable oscillator 32 applied to its base due to the gating action of AND gate 60. As a result, current flows from the positive side of the power supply 21 through transistor 14, through windings 11 and 13, and through transistor 19 to the negative side of the power supply 21.

The transistor 16 is enabled just before transistor 14 is disenabled as can be seen from waveforms 22' and 16' shown in FIG. 7. The overlap interval between waveforms 22' and 16' is within the width of a pulse from the programmable oscillator 32 as shown at 77. Thus, as soon as current flowing through winding 11 is terminated, current will begin flowing through transistor 16, winding 12, winding 13 and transistor 19. Pulses from the programmable oscillator 32 are applied to transistor 15 commencing with the last pulse applied to transistor 19, again as can be seen by referring to the waveforms 19' and 15' as shown in FIG. 7. Thus, at this time current is flowing through transistor 16 winding 12, winding 11 and transistor 15.

Shortly before the enabling pulse to transistor 16 is terminated, transistor 18 is switched on whereby current is next provided to the motor windings through transistor 18, winding 13, winding 11 and transistor 15. When the last pulse from the programmable oscillator 32 is applied to transistor 15, transistor 17 begins to receive pulses and therefore current will begin to flow through transistor 18, winding 13, winding 12 and transistor 17.

Figure 6:
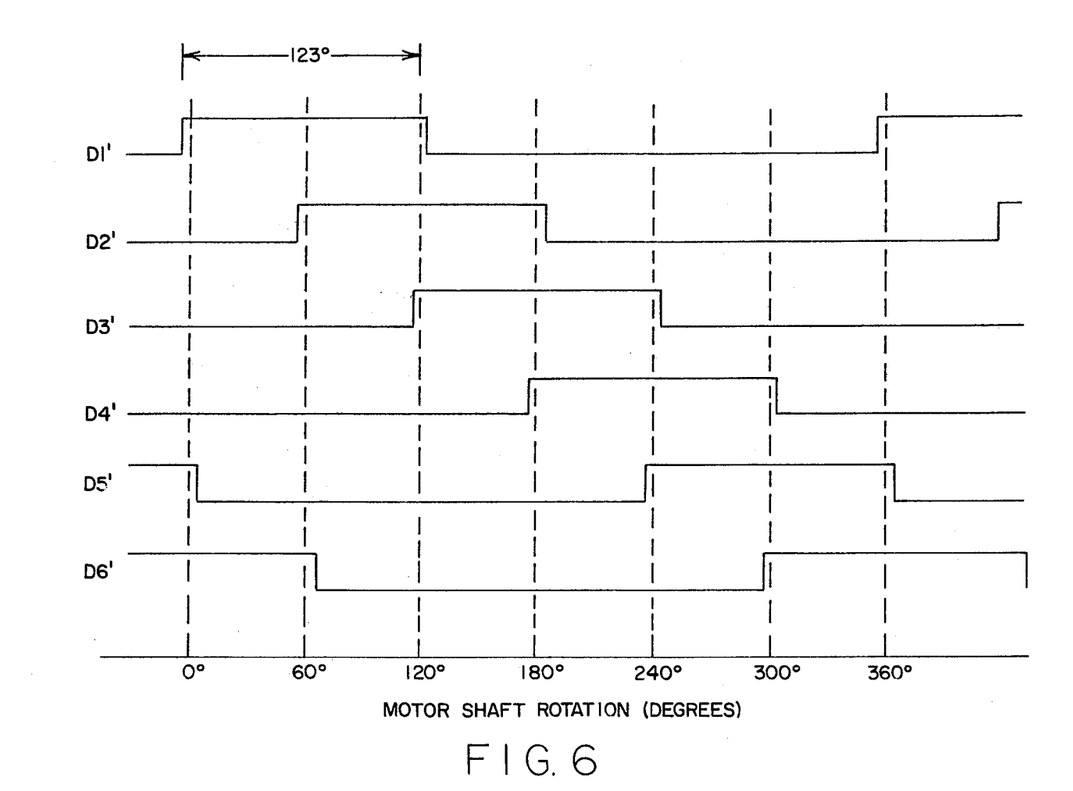
FIG. 6 is a waveform drawing illustrating the waveform outputs derived from the chopper wheel and sensors associated with the motor shaft.

From the foregoing it can be seen that signals from the shaft rotation sensor 23 comprising outputs D1', D3' and D5' as shown in FIG. 6 are directed by the decoder 20 to corresponding power transistors 14, 16 or 18, thereby causing them to switch on at the appropriate times. Signals from the shaft, rotation sensor 23 comprising outputs D2', D4' and D6' as shown in FIG. 6 enable their respective AND gates 60, 62 and 64, thereby allowing a pulse modulated signal from the programmable oscillator 32 to be applied to transistors 19, 15 and 17 respectively.

It should be noted for each pair of transistors driving the motor, only one transistor is on continuously during its normal excitations cycle while the other is pulsed. This mode of operation reduces the power consumption of the pulsed transistor. Note also that serrations in the modulated waveforms overlap the waveform of the next transistor to be modulated so that the excitation of the next winding is precisely synchronized to excitation of the preceding winding, thereby eliminating an unevenness or "notching" sometimes associated with DC motor controllers. This system operates so that the programmable oscillator 32 is resynchronized every 120 degrees of motor rotor shaft as will be explained below, thereby providing a motor controller having a smooth torque transfer characteristic.

Figure 8:
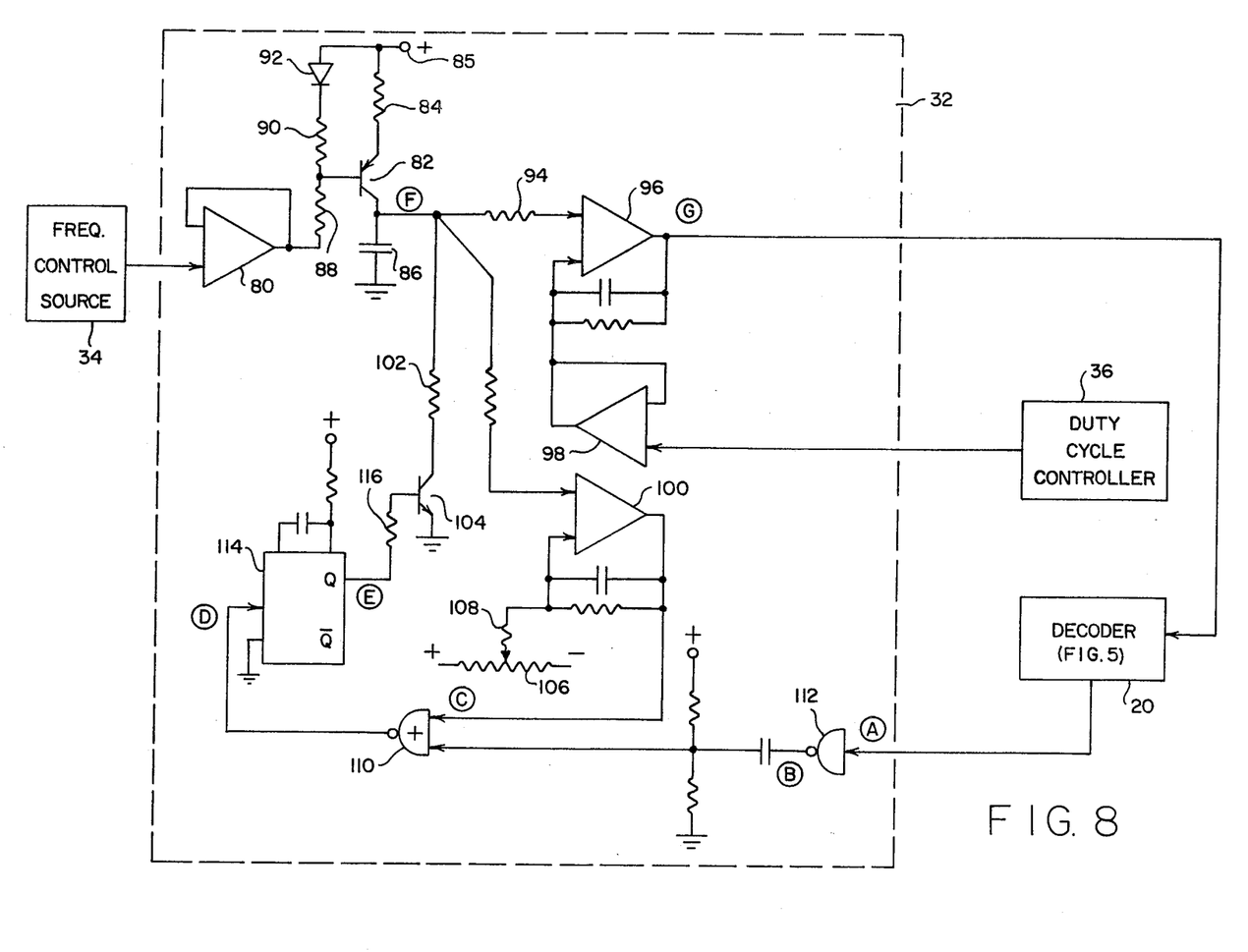
FIG. 8 is a schematic diagram of the oscillator.

FIG. 8 is a schematic diagram of the programmable oscillator 32. A DC voltage from the frequency control source 34, which is related to the frequency desired for the output of the programmable oscillator 32 is applied to an operational amplifier 80. The output of the operational amplifier 80 drives an integrating circuit including a transistor 82 having its emitter connected through a resistor 84 to a positive voltage source 85. The transistor 82 collector is connected to one side of a capacitor 86, the other side being connected to ground. The output of the amplifier 80 is connected to the base of the transistor 82 through a resistor 88 which is connected to a resistor 90 which is in turn connected to the positive voltage source 85 through a diode 92. Resistors 88, 90 and diode 92 comprise a biasing means for the transistor 82.

When transistor 82 becomes conductive due to a voltage from the amplifier 80, it begins to charge up the capacitor 86. Capacitor 86 is connected through a resistor 94 to a comparator circuit 96. Comparator 96 comprises a differential amplifier having as one input the output of an operational amplifier 98 and as the other input a voltage related to the voltage on capacitor 86. Amplifier 98 receives a DC voltage input from the duty cycle controller 36, this DC level determining the width of the pulses which are provided by the comparator 96 to the decoder 20. When a charge on capacitor 86 is below the output voltage of amplifier 98, a voltage output is supplied by the comparator 96 to the decoder 20, and more specifically to the AND gates 60, 62 and 64 as shown in FIG. 5. When the charge on the capacitor 86 exceeds the output voltage of amplifier 98, the output voltage from the comparator 96 is removed.

The collector of transistor 82 is also connected to another comparator 100, and to a transistor 104 through a resistor 102. The comparator 100 has a voltage level as an input which must be exceeded by the output of capacitor 86 in order for it to provide an output, this voltage level being determined by a potentiometer 106 connected across a voltage source. A biasing voltage is selected by the potentiometer 106 arm and applied through a resistor 108 to one input terminal of the comparator 100.

The output of the comparator 100 which occurs when the capacitor 86 voltage exceeds the voltage selected from the potentiometer 106 is applied to a NOR gate 110. Another input to the NOR gate 110 is the output of an inverter 112 which has as an input the output of the OR gate 68 shown in FIG. 5. Either in the presence of an output from the comparator 100 or in the presence of a feedback signal from the decoder 20 as represented by an output from the inverter 112, an output is obtained from the NOR gate 110. This output or reset pulse triggers a one-shot multivibrator 114. When the one-shot multivibrator 114 is set, its output designated at Q is high. This Q signal is connected through a resistor 116 to the base of transistor 104, thereby causing transistor 104 to become conductive and discharge the capacitor 86. As one can appreciate, this provides control over the pulses to be supplied to the decoder 20.

Figure 9:
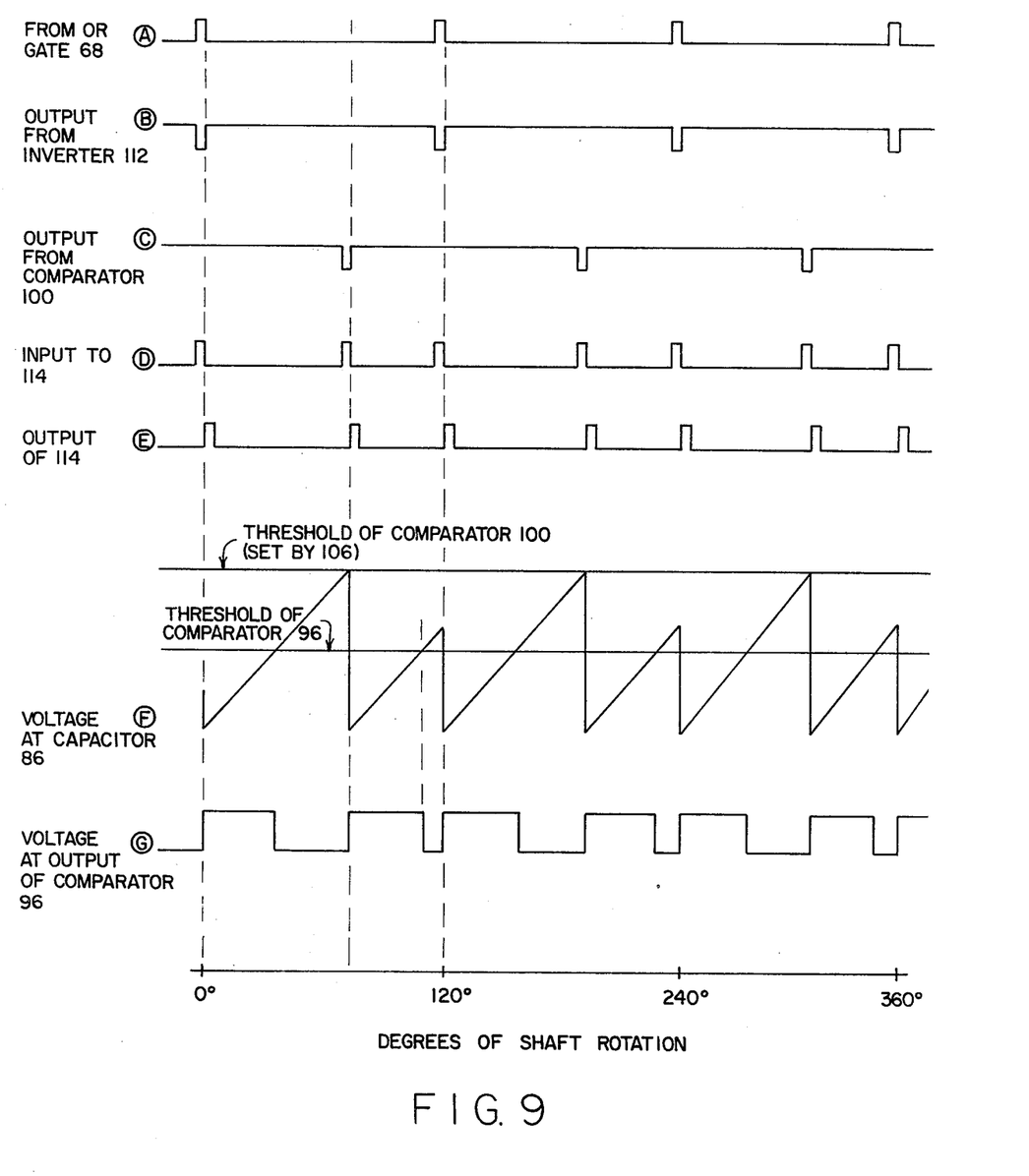
FIG. 9 is a waveform drawing illustrating various waveforms within the programmable oscillator.

To summarize operation of the programmable oscillator 32, reference should be made to FIG. 8 in conjunction with the waveforms of FIG. 9. The output from OR gate 66 in the decoder 20 is shown as waveform A, this output being inverted by the inverter 112 as shown in waveform B. A pulse output from the comparator 100 is shown in waveform C, this output occurring each time that a charge on the capacitor 86 reaches a predetermined voltage level in accordance with a setting of the potentiometer 106. The input to and output from the one-shot multivibrator 114 are shown in waveforms D and E respectively. As previously explained, each output pulse from the multivibrator 114 causes the capacitor 86 to discharge to ground through the transistor 104. Referring to waveform F, it can be seen that voltage on the capacitor 86 builds up at a constant rate until an output pulse from the multivibrator 114 is generated, these pulses being generated for every 120 degrees of motor shaft rotation and also for each time the voltage on the capacitor 86 reaches a predetermined level. The time required for the capacitor 86 voltage to reach the predetermined level is controlled by the frequency control source 34. The output waveform G provided by the comparator 96 is determined by the duty cycle controller 36, the waveform returning to zero each time the comparator 96 threshold is reached as previously explained. Thus, the output of the comparator 96 comprises a square wave which is initiated at each 120 degrees increment of shaft rotation and has a frequency determined by the frequency control source 34 and a duration, or duty cycle, determined by the duty cycle controller 36. Any output frequency can be selected as can be seen by comparing waveform G of FIG. 9 with those of FIG. 7.

The frequency control source 34 and duty cycle control 36 may be signals provided by a computer for programming operation of the motor 10.

There has accordingly been shown and described herein a novel and useful means for controlling the speed and torque of a brushless DC motor.

What is claimed is:

1. A speed and torque controlling system for a brushless DC motor of the type having three phase windings comprising:
   means for deriving synchronizing signals from a motor shaft of said motor as said motor rotates;
   decoder means to which said synchronizing signals are applied for producing, in response thereto, first and second gating signals;
   means for generating correlation signals related to said first gating signals;
   a first signal source;
   a second signal source;
   a programmable oscillator having an output signal related to said correlation signals, said programmable oscillator comprising means responsive to said first signal source for determining the frequency of said output signal, said programmable oscillator further comprising means responsive to said second signal source for determining the duty cycle of said output signal;
   means for altering said first gating signals by said programmable oscillator output signal to provide third gating signals; and
   driving means responsive to said second gating signals and said third gating signals for applying current to the windings of said motor.

2. The system as recited in claim 1 in which said programmable oscillator means responsive to said first signal source for determining the frequency of said programmable oscillator comprises integrating means responsive to said first signal source for producing an integrated signal output; and
   said means responsive to said second signal source for determining the duty cycle of each output signal from said output of said integrating means and the output of said second signal source and producing an output over the interval during which said integrated signal output has a predetermined relationship to the output of said second signal source.

3. The system as recited in claim 2 further comprising:
   means for generating a reset signal responsive to said correlation signals; and
   means responsive to said reset signal for resetting said integrating means.

4. The system as recited in claim 1 in which said first signal source and said second signal source comprise a computer.

5. The system as recited in claim 1 wherein said second gating signals comprise three gating signals and said third gating signals comprise three gating signals, said driving means comprising:
   three pairs of transistors each having base, emitter and collector electrodes;
   means for connecting the collector electrodes of each pair of transistors together;
   a power supply having output terminals;
   means for connecting the emitters of each pair of transistors across said power supply output terminals;
   means for connecting the collectors of each pair of transistors to a different one of said DC motor three phase windings;
   means for applying one of said second gating signals to the base electrode of one of the transistors in each pair for enabling them to become conductive; and
   means for applying one of said third gating signals to the base electrode of one of the other transistors in each of said three pairs of transistors.

6. A method for controlling a brushless DC motor of the type having three phase windings, the steps comprising:
   deriving synchronizing signals from a motor shaft of said motor as said motor rotates;
   deriving first and second gating signals in response to said synchronizing signals;
   generating correlation signals related to said first gating signals;
   generating an oscillator output signal having frequency and duty cycle characteristics related to said correlation signals, the output of a first signal source for determining the frequency of said oscillator output signal, and the output of a second signal source for determining the duty cycle of said oscillator output signal;
   altering said first gating signals by said oscillator output signal to provide third gating signals; and
   applying current to the windings of said motor in response to said second gating signals and said third gating signals.

* * * * *